Figure 2:
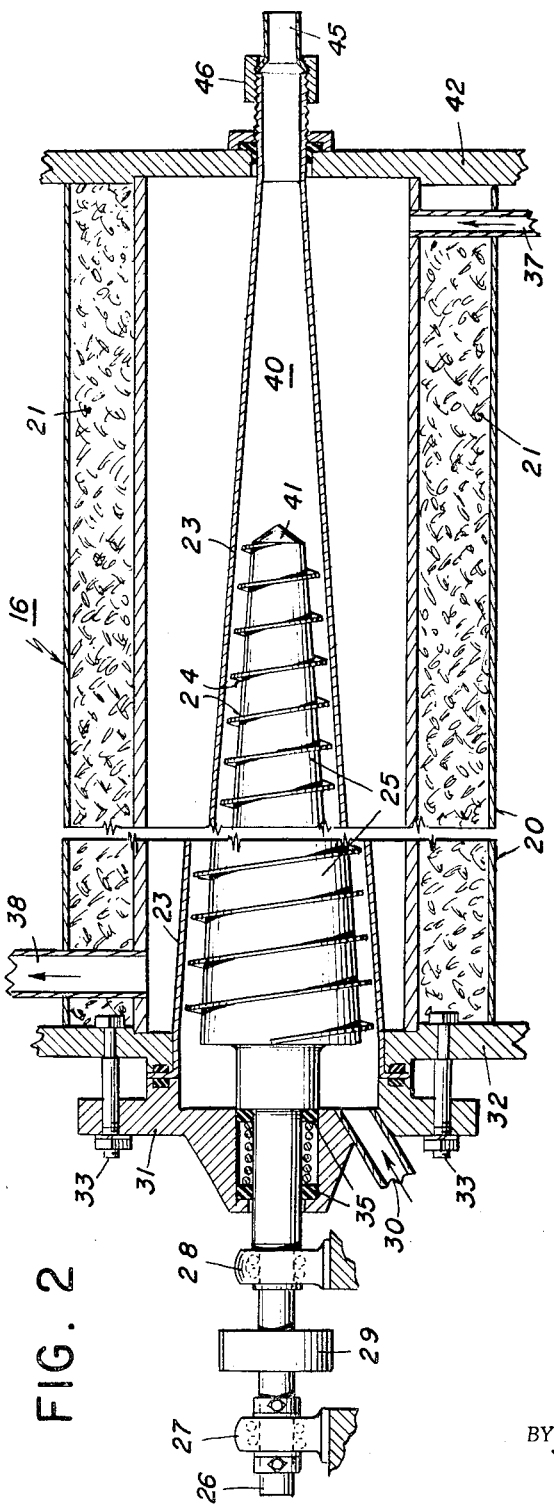

March 3, 1959 R. HOLZCKER 2,876,111
METHOD AND APPARATUS FOR PROCESSING FOOD MATERIAL
Filed April 6, 1954 2 Sheets-Sheet 1
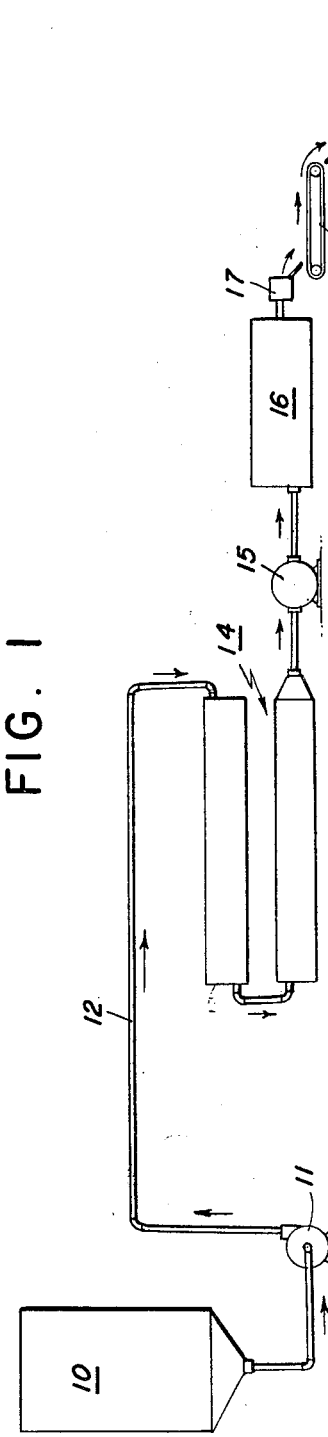
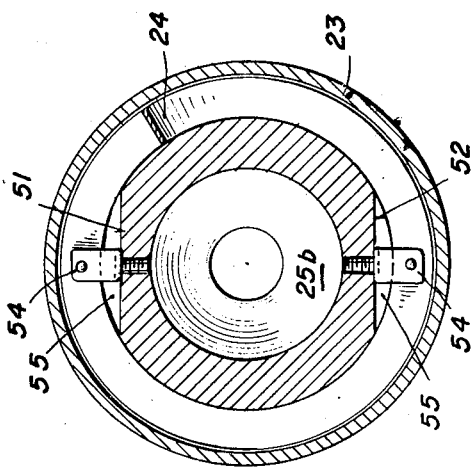
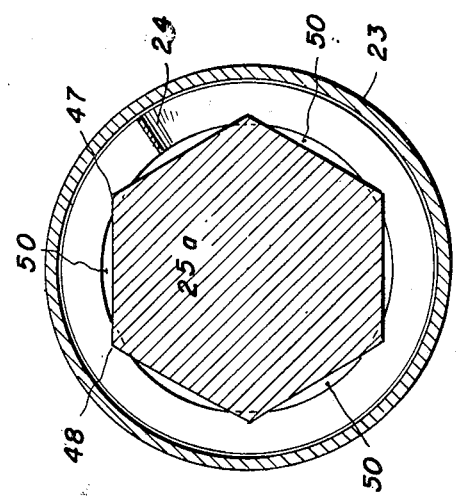
INVENTOR
RICHARD HOLZCKER
BY Henry H. Snelling
ATTORNEY March 3, 1959 R. HOLZCKER 2,876,111
METHOD AND APPARATUS FOR PROCESSING FOOD MATERIAL
Filed April 6, 1954 2 Sheets-Sheet 2

INVENTOR
RICHARD HOLZCKER,
BY Henry H. Snelling
ATTORNEY

United States Patent Office 2,876,111
Patented Mar. 3, 1959

2,876,111

METHOD AND APPARATUS FOR PROCESSING FOOD MATERIAL

Richard Holzcker, Lake Wales, Fla.

Application April 6, 1954, Serial No. 421,377

11 Claims. (Cl. 99—171)

This invention relates to frozen foods and has for its principal object the provision of means and apparatus for processing food material obtained from citrus fruits or from sub-tropical fruits in such manner as best to retain the exceptionally high vitamin potency of the raw material, whether it be in the form of fruit juices with high sugar content, as purees with relatively low sugar content, or as a product intermediate between these.

An object of the invention is to provide a forming unit for receiving a food product frozen to a sherbet-like consistency, chilling the material further and discharging the hardened product thru a shaping nozzle as an extruded ribbon of desired cross section, circular, square, or otherwise, but suitable for wrapping in a high speed packaging machine.

Another object of the present invention is to provide a method of forming fruit concentrate into self-supporting cartridges or blocks suitable for wrapping at temperatures in the neighborhood of zero Fahrenheit so that these wrapped products may then be stored in the usual frozen food containers and when taken from such containers and brought to room temperature the material will retain practically all of the desirable original qualities of the food.

A further object of the invention is to increase slightly the size of at least some of the ice crystals formed in the frozen product whereby a satisfactory cohesiveness in the product is obtained, thus avoiding brittleness in the hardened frozen pieces and making it much easier to wrap the frozen pieces at the high speeds most economical in present day wrapping machines.

A still further object of the invention is to provide a machine in which the usual objection of adhesiveness of the freezing product as it gradually becomes more dense is avoided, such objection being exhibited frequently by adhesiveness at the base of the flight of a rotary conveyor. By relieving the screw flight of contact with its shaft at frequent intervals in the travel, and particularly when using a tapered conveyor, the screw becomes self-cleaning and the stated adhesiveness is minimized or eliminated.

A still further object of the invention is to so design the mechanism of the system that occluded air is reduced to an absolute minimum. Air not only oxidizes the product and consequently lowers its quality, but the presence of air bubbles in the product as it is discharged from the forming nozzle would seriously affect the desired control by volume alone as the weight of the individual cartridges of the same volume would vary with the amount of air present and would consequently prevent the desired uniformity of the final product.

Figure 3:
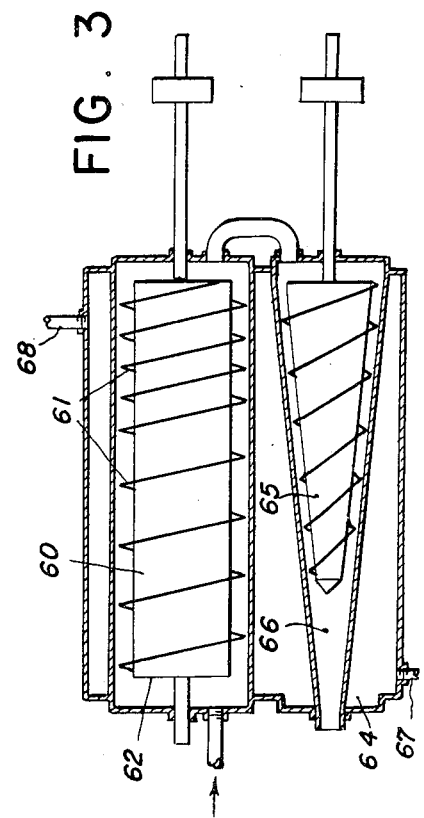

In the drawings:

Figure 1 shows a highly schematic view of the process.
Figure 2 is a section thru a preferred form of extruder.
Figure 3 shows a modified hardening unit.
Figure 4 is a cross section thru a rotary conveyor.
Figure 5 is a modification.

Figure 1 shows a general flow sheet. Concentrated juice or other flowable food material is supplied to a supply tank 10 often referred to as a surge tank. The product at this time is concentrated to a point where it contains about 60% of water by weight. A pump 11 may force the concentrated juice thru piping 12 to a chilling device 14 of any desired type. These machines are readily available and are quite efficient in reducing the temperature of the concentrated juice to a point as low as 20° F. Some of these heat transfer devices are capable of producing a temperature of 15° or possibly lower than that but their efficiency at low temperatures become very poor and consequently it is my preference to use available heat transfer mechanisms 14 only to about 20°. Usually a metal cylinder rotates in an insulated jacket inside of which a heat transfer medium constantly circulates about a heat transfer tube constantly engaged by a considerable number of independent scraper blades so that only a very thin stream of material flows thru the cylinder and there is a large area of exposed heat transfer surface. The scraper blades are preferably of the floating type and are forced outwardly against the heat transfer surface as the shaft rotates at high speed. The blades automatically remove any product film that might otherwise accumulate, also providing vigorous agitation of the product so that the cooling is done in a minimum of time.

A metering pump 15 driven by a variable speed motor may be inserted between the heat transfer mechanism 14 and the extrusion device 16, which is shown in Figure 2, receives the product either from the metering pump 15 or from the prechilling unit 14. The extruder discharges thru an intermittent cut-off device 17 and delivers individual cartridges or blocks of hardened frozen material, still slightly plastic however, to a belt 18 feeding to a high speed wrapping machine 19 of any desired character. The cut-off mechanism 17 may be of any desired type and it is driven by a variable speed motor or some equivalent mechanism as it is necessary to secure close control over the volume handled by the machine in order that the product as served may be uniform. The refrigeration requirements can be controlled by regulation of the back-pressure or suction-pressure of the refrigerant and, within fairly narrow limits, by the speed at which the screw in the extruder 16 rotates.

Referring now particularly to Figure 2, the extruder 16 includes an outer shell 20, insulation 21, a refrigerant jacket 22, a conical tube 23 in which rotates a spiral flight 24 mounted on a tapered body 25 extending about two-thirds of the axial length of the chamber within the tube 23. The body 25 is preferably integral with the shaft 26 mounted in well spaced bearings 27 and 28 between which is positioned the driven pulley 29. The feed inlet 30 is thru a plate 31 bolted to the frame 32 as by the bolts 33 and carrying the usual rotary shaft seals 35. The refrigerant enters thru pipe 37 under pressure and exits thru the refrigerant suction pipe 38.

The holding chamber 40 between the end 41 of the extruder screw and the end wall 42 of the extruder is of considerable importance. There is no agitation within this holding chamber 40 except that due to the forward movement of the frozen and hardened material which is still slightly plastic but sufficiently solid even at +5° F. to work perfectly as blocks or cartridges when fed to the high speed wrapping machine 19. The holding chamber 40 not only provides a space wherein ice crystal formation can continue without agitation while still under refrigeration but it also serves to convert a maximum portion of the applied refrigeration into the desired hardening effect. The holding chamber 40 provides the desirable cohesiveness in the product at the preferred chamber temperature range which at the nozzle end is preferably from +5° to −10° F.

If the conveyor flight extended completely to the end of the extruder the product would tend to become brittle corresponding to what a cake baker would describe as being "short." Since there is no agitation in the holding chamber 40 the product is allowed to form crystals of larger size than can be formed in the small space between the conveyor base 25 and the tube 23, this space being less than half an inch and producing very small ice crystals. The formation of the larger crystals in the product as it is leaving the forming tube gives the cohesiveness which is required to hold the predetermined shape of the cartridge as the latter, which is cut off by the mechanism 17, is moved by the conveyor 18 to the wrapping machine 19.

As previously stated the flight or flights 24 act as scrapers to prevent the formation of a substantial sheet of ice on the inside refrigerated wall of the tube 23 which sheet would reduce the heat transfer rate. This requires the least possible clearance between the outside edge of the screw flight 24 and the inside surface of the tube 23. Minimum clearance here also prevents the short circuiting known as flushing back which occurs as long as the product is fairly fluid. It is therefore possible to exert substantial pressure on the concentrated food product as it is being solidified, thus enabling the product to be forced through a relatively small nozzle of desired shape and dimensions. The nozzle 45 is readily detachable so that any one of a number of different nozzles may be used depending upon circumstances. The nozzle is held to the exit end of the tube 23 by means of a sanitary fitting 46 of preferred type. I find an exit diameter for the tube 23 of roughly one and one-half inches will give excellent results.

As the frozen and hardened material becomes more and more solid because of the continued application of refrigeration it becomes sticky and there is a considerable tendency at this time for it to adhere to the flights 24, resisting forward movement. This difficulty is overcome nicely by providing a relief clearance between the flight and the shaft which carries this flight or flights. By intermittently providing such a relief clearance a certain amount of the product may pass backward into the prior turn of the screw. Bridging of the space between screw flights is consequently prevented. Not only is bridging prevented but the additional advantage is gained that we have increased agitation without appreciable increase in power requirements, this being due to the proportion of the product which flows reversely to the major movement.

There is a limit, however, to the amount of relief clearance that can be provided and the backward flow must therefore be limited by having the clearance never greater than one-fourth of the projected surface of each screw flight. While the relief clearance can be obtained in any desired way as by intermittently increasing the inside diameter of the flight, I find it convenient to form the body 25 as a tapered hexagon shown at 25a in Figure 4. The flight 24 engages the body at the points 47, 48, etc. and this provides clearance spaces 50. In the modification shown in Figure 5 the body 25 is replaced by a hollow cone 25b. This is reduced on opposite sides as at 51 and 52 and the flight 24 is supported in the center of these elongated flattened portions 51 and 52 by studs such as 54 giving a clearance here numbered 55.

The modification shown in Figure 3 contemplates dividing the extruder into two separate chambers. In one a cylindrical drum 60 carries a helical flight 61 which at the receiving end 62 has the convolutions fairly well separated but at the opposite or exit end, the turns of the flights are much closer together. The final chamber numbered 64, however, follows more closely the preferred form in Figure 2 employing a core 65 tapered and providing a holding chamber 66 to provide for the formation of the larger preferred crystals. It might be noted that as the material which is still flowable leaves the end of the screw, agitation ceases and consequently the material will tend to crystallize at a relatively fast rate. While the heat of crystallization is taken up by the remainder of the material as sensible heat, the temperature of the material will not be raised during this hardening of the product because of the refrigerating effect provided by the refrigerant entering at 67 and leaving at 68, the product passing from the first chamber to the second thru the pipe 69.

What I claim is:

1. The method of treating concentrated citrus juice which includes chilling the concentrate to a temperature of from 25° to 15° F. in a heat transfer mechanism, transferring the partly frozen material to an extruder, further chilling the material in the extruder and discharging same from the extruder at a temperature between the limits plus ten degrees and minus twenty degrees, whereby the extruded frozen juice may be cut into blocks and wrapped in a high speed wrapping machine.

2. The process of claim 1 in which the entrance temperature of the extruder is roughly 20° and the discharge temperature is below 5°.

3. A screw conveyor including an imperforate body of substantially uniform shape having a plurality of longitudinal plane surfaces and a screw flight secured to the body to engage the body on both sides of each plane surface and to clear portions of said plane surfaces, whereby to minimize adhesion to the base of the flight of material being conveyed where the material is below its freezing temperature, said clearance being less than one-fourth of the projected surface of the flight.

4. A screw conveyor consisting of a hexagonal body and a screw flight secured to the edges of the hexagonal body, the outside surface of the flight being bounded by a surface of revolution, and the inside surface of the flight clearing each of the six flat surfaces of the body, the area of each of the spaces between the flight and the flat side being one-sixth of the area of the projected surface of the flight, whereby to minimize adhesiveness of the freezing product to the base of the flight and to make the screw conveyor self-cleaning.

5. A screw conveyor extruder having an imperforate outer tube, a conveyor body, and a screw flight wound upon said body, characterized by the provision of spaced relief clearances between the body of the conveyor and the inside surface of the flight, and by the outside surface of the flight being bounded by a surface of revolution and fitting snugly the imperforate outer tube of the extruder to prevent flushing back proximate the inner surface of the tube, said relief clearances being less than one-fourth of the projected surface of each screw flight, whereby substantial pressure may be exerted on a liquid being frozen in the extruder and the spaced relief clearances permit a certain amount of the freezing liquid to pass backward into a prior turn of the screw near the base of the screw and thus minimize adherence of the freezing liquid as it becomes more solid.

6. In an extruder, an imperforate refrigerating tube of conical shape, a screw conveyor substantially engaging said tube to prevent flushing back and extending about two-thirds of the length of the tube whereby to provide a holding chamber through which the material passes with only such agitation as due to the forward movement of the material, and therefore forms larger ice crystals than are formed in the screw conveyor portion, thus making a less brittle product.

7. A screw conveyor comprising a tapered hexagonal body and a screw flight secured to the edges of the hexagonal body, said flight being of uniform radial height with its outside edges bounded by a conical surface.

8. The method of producing a block of frozen citrus fruit concentrate in a form to retain its vitamin potency and yet be capable of being wrapped in a high speed wrapping machine at a temperature of about zero degrees Fahrenheit: which comprises concentrating citrus fruit juice in the absence of air to reduce its water content, freezing the concentrated juice free of occluded air to a sherbet-like consistency, then constantly decreasing the volume of the frozen juice by increasing the pressure on the juice and extruding the hardened condensed material in substantially solid dry form at a temperature well below its freezing temperature.

9. The method of minimizing adherance of a freezing product, of the type which becomes sticky as it freezes, to the base of the flight of a rotary conveyor as the conveyed freezing product becomes more dense and hence sticky, which comprises forcing a hollow body of the freezing product to move forward at its periphery and constantly moving a portion of the freezing product in reverse direction adjacent the base of the flight of the conveyor whereby such reverse movement of the freezing product makes the screw self-cleaning.

10. The method of processing citrus food material in order to retain the high vitamin potency of the raw material and yet make the product in form to be wrapped in a high speed wrapping machine which comprises concentrating the food material in the absence of air to reduce the water content to roughly 60 percent of water by weight, chilling the concentrated food material by heat transfer to a temperature of approximately 20° F., then further chilling the material in a thin stream from a sherbet-like consistency to a denser state, while constantly decreasing its volume, forming fine ice crystals in the material, then forming coarser ice crystals in the material, then immediately extruding the hardened condensed material as a ribbon in substantially solid dry form but still slightly plastic at a temperature below 5° F., intermittently cutting the extruded ribbon into blocks of equal volume and wrapping the individual blocks while still in dry frozen form, whereby the blocks being free of occluded air may be wrapped by a high speed wrapping machine and form wrapped blocks of uniform weight as well as uniform volume.

11. The method of extruding partially frozen citrus material which includes subjecting the material, in the form of an annular body bounded by two co-axial surfaces of revolution spaced apart less than half an inch, to the action of a refrigerant through a portion of its travel while agitating the material thereby forming small ice crystals and then subjecting the material to further freezing but without agitation while in the form of a solid body bounded by the outer one of said surfaces of revolution, thereby forming larger ice crystals, whereby to harden the extruded product and avoid brittleness by giving the product sufficient cohesiveness to hold its extruded shape.

References Cited in the file of this patent

UNITED STATES PATENTS

| | | |
|---|---|---|
| 493,966 | Bowley | Mar. 21, 1893 |
| 643,001 | Overton | Feb. 6, 1900 |
| 813,375 | Glauser | Feb. 20, 1906 |
| 824,075 | Gerner | June 19, 1906 |
| 1,312,424 | Richardson | Aug. 5, 1919 |
| 1,361,346 | Nichols | Dec. 7, 1920 |
| 1,560,855 | Queneau | Nov. 10, 1925 |
| 1,690,784 | Hilgers | Nov. 6, 1928 |
| 1,881,171 | Cooley | Oct. 4, 1932 |
| 2,013,025 | Bottoms | Sept. 3, 1935 |
| 2,062,277 | Routh | Nov. 24, 1936 |
| 2,181,404 | Koppitz | Nov. 28, 1939 |
| 2,206,419 | Miller | July 2, 1940 |
| 2,378,539 | Dawihl | June 19, 1945 |
| 2,535,462 | Stoelting | Dec. 26, 1950 |
| 2,571,136 | Horton | Oct. 16, 1951 |
| 2,594,442 | Irwin | Apr. 29, 1952 |
| 2,674,104 | Street | Apr. 6, 1954 |

FOREIGN PATENTS

| | | |
|---|---|---|
| 584,339 | Great Britain | Oct. 7, 1942 |
| 19,921 | Netherlands | May 15, 1929 |